United States Patent [19]
Yoshimura

[11] 3,795,230
[45] Mar. 5, 1974

[54] PRIMARY AIR SUPPLY FOR AN INTERNAL COMBUSTION ENGINE

[75] Inventor: Shigetake Yoshimura, Hiroshima, Japan

[73] Assignee: Toyo Kogyo Company Limited, Hiroshima-ken, Japan

[22] Filed: Mar. 27, 1973

[21] Appl. No.: 346,492

Related U.S. Application Data

[63] Continuation of Ser. No. 147,580, May 27, 1971, abandoned.

[52] U.S. Cl..... 123/97 B, 123/DIG. 11, 123/124 R, 123/124 B, 123/119 D, 137/480
[51] Int. Cl............................................ F02d 31/00
[58] Field of Search.............. 123/DIG. 11, 97 B, 123/124 D, 119 D, 119 DB; 137/480

[56] References Cited
UNITED STATES PATENTS

| | | | |
|---|---|---|---|
| 1,751,322 | 3/1930 | Gravel | 123/DIG. 11 |
| 2,439,573 | 4/1948 | Mallory | 123/97 B |
| 3,431,897 | 3/1969 | Eltinge | 123/97 B |
| 3,364,909 | 1/1968 | Mick | 123/124 R |
| 3,698,371 | 10/1972 | Mitsuyama | 123/97 B |
| 3,741,177 | 6/1973 | Schutz | 123/DIG. 11 |

*Primary Examiner*—Wendell E. Burns
*Attorney, Agent, or Firm*—Sughrue, Rothwell, Mion, Zinn & Macpeak

[57] ABSTRACT

In a primary air supply for an internal combustion engine, when an ignition switch is shut off, the primary air supply means supplies optimum primary air to the inlet system in order to prevent after burning which normally occurs when shutting off said ignition switch after continuous operation of the engine.

6 Claims, 2 Drawing Figures

PATENTED MAR 5 1974

3,795,230

INVENTOR
SHIGETAKE YOSHIMURA

BY Sughrue, Rothwell, Mion, Zinn & Macpeak
ATTORNEYS ations in which:
PRIMARY AIR SUPPLY FOR AN INTERNAL COMBUSTION ENGINE This is a Continuation of application Ser. No. 147,580, filed May 27, 1971, now abandoned.

BACKGROUND OF THE INVENTION

1. Field of the Invention

This invention relates to an intake system of an internal combustion engine, and more particularly to a primary air supplying means for preventing afterburning phenomenon produced immediately after an ignition switch is shut off.

2. Description of the Prior Art

Heretofore, internal combustion engines in which secondary air is supplied to the exhaust gas by an air pump to oxidize unburned detrimental components within a reactor provided in the exhaust system of the engine in order to remove the unburned detrimental components such as CO or HC contained in the exhaust gas of the internal combustion engine, is well known.

In such engine, an ignition circuit is cut off by turning an ignition switch off after continuous operation, the engine operates for a while due to inertia. As a result, the air pump also operates so that it supplies the secondary air into the exhaust system at the same time air-fuel mixture derived from a carburetor and fuel adhered onto the inner wall face of an inlet passage are taken into the combustion chamber of the engine. However, since the ignition circuit is cut off, the ignition plug is not ignited so that the dense mixture is not burned within the combustion chamber.

Therefore, the dense mixture is introduced into the reactor of the exhaust system so that it is mixed with the secondary air with the result that abrupt explosion or an afterburning phenomenon occurs within the high temperature reactor. Accordingly, the phenomenon reduces the durability of the reactor and it is not preferable in point of noise and public pollution.

SUMMARY OF THE INVENTION

One object of the present invention is to provide a primary air supplying means for preventing an afterburning phenomenon from occurring after an ignition switch is cut off.

Another object of the present invention is to provide a primary air supplying means for introducing primary air into the inlet passage after the ignition switch is cut off for preventing the afterburning phenomenon.

A further object of the present invention is to provide a primary air supplying means for supplying the primary air into the inlet passage when the engine is decelerated and when the ignition switch is cut off for preventing the afterburning phenomenon.

Still another object of the present invention is to provide a primary air supplying means for supplying the optimum primary air into the inlet passage, at the same time, to remove unburned detrimental components within the exhaust gas by continuously igniting the ignition plug for a while after the ignition switch is cut off, in order to prevent the afterburning phenomenon.

BRIEF DESCRIPTION OF THE DRAWINGS

Further objects, features and advantages of the present invention will become apparent from the following description taken in conjunction with the accompanying drawings, in which.

DESCRIPTION OF THE PREFERRED EMBODIMENTS

Figure 1:
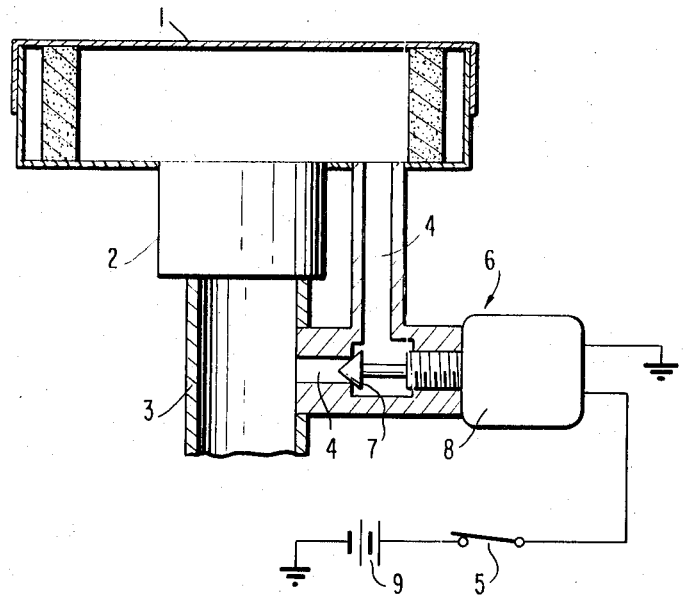
FIG. 1 is a sectional view of one embodiment of a primary air supplying means for an internal combustion engine according to the present invention.

Reference is now made to the drawings, particularly to FIG. 1 which shows one embodiment of the present invention.

An inlet system of an internal combustion engine has an air cleaner 1, a carburetor 2 and an inlet passage 3. The inlet passage 3 communicates at one end with the carburetor 2 and at the other with the combustion chamber of the engine. A primary air passage 4 opens at one end to the air cleaner 1 and opens at the other to the inlet passage 3 downstream of a throttle valve in the carburetor. The primary air passage 4 supplies a primary air into the inlet passage when an ignition switch 5 is shut off. A valve means 6 opens or closes the primary air passage 4 for controlling the supply of the primary air. The valve means 6 has a valve member 7 for opening or closing the primary air passage 4 and a solenoid device 8 for controlling the valve member 7. The solenoid device 8 is electrically connected to a power source 9 through the ignition switch 5. The solenoid device 8 so controls the valve member 7 as to open the primary air passage 4 when the ignition switch 5 is cut off and to close the primary air passage 4 when the ignition switch 5 is turned on.

When the engine is operated, the ignition switch 5 is turned on so that the solenoid device 8 moves the valve member 7 leftwardly of the drawing so as to close the primary air passage 4. Therefore, the primary air is not supplied from the air cleaner 1 to the inlet passage 3. Then, when the ignition switch 5 is turned off in the state that the temperature of the exhaust system and the reactor becomes high after the engine is continuously run, the solenoid device 8 moves the valve member 7 rightwardly of the drawing so as to open the primary air passage 4. Then, since the engine rotates by its inertia for a while, excessive primary air is supplied from the air cleaner 1 into the inlet passage 3 through the primary air passage 4. The primary air is mixed with fuel adhered onto the wall surface of the inlet passage 3 and with the mixture from the carburetor 2 so that it becomes a dilute mixture outside of its combustible range prior to intake into the combustion chamber of the engine. Then, since the ignition plug of the engine is not ignited, this dilute mixture is not ignited by the ignition plug of the engine, it is introduced into the exhaust system as it is. Further, the dilute mixture is mixed with the secondary air of the air pump to become further diluted to be introduced into the exhaust system and reactor of high temperature.

As a result, the dilute mixture will not abruptly explode nor the afterburning phenomenon occur within the reactor and the high temperature exhaust system.

Figure 2:
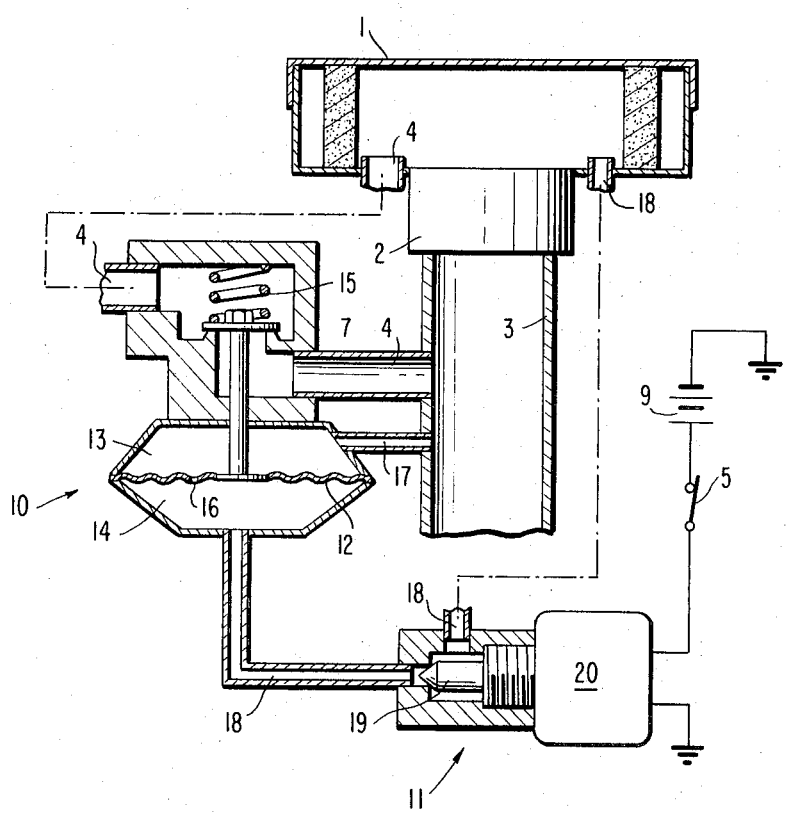
FIG. 2 is a sectional view of another embodiment of a primary air supplying means for an internal combustion engine according to the present invention.

Referring now to FIG. 2, which shows another embodiment of the present invention, the invention will now be described wherein like parts and components are designated by the same numerals as in FIG. 1.

A valve means 6 has a diaphragm device 10 for controlling a valve member 7 for opening and closing a primary air passage 4 and a solenoid valve means 11 for controlling the diaphragm device 10. The diaphragm device 10 has a first diaphragm chamber 13 and a second diaphragm chamber 14 divided by a diaphragm 12 fixed with the valve member 7. The valve member 7 is so urged by a spring 15 as to close the primary air passage 4. This spring 15 may be provided in the diaphragm device 10 so as to close the primary air passage 4. The diaphragm 12 has a balance hole 16 of small diameter communicating with the first diaphragm chamber 13 and the second diaphragm chamber 14. The first diaphragm chamber 13 is connected by a tube 17 to an inlet passage 3 for introducing the inlet vacuum of the inlet passage 3. And, the diaphragm 12 so moves the valve member 7 as to open the primary air passage 4 against the spring 15 upon introduction of high inlet vacuum into the first diaphragm chamber 13 when the engine is decelerated. The second diaphragm chamber 14 communicates with an air cleaner 1 through a pipe 18. The solenoid valve means 11 has a valve 19 for opening and closing the pipe 18 and a solenoid 20 for controlling the valve 19. The solenoid 20 is electrically connected through an ignition switch 5 to a power source 9. The solenoid valve means 11 so controls the valve 19 and the solenoid 20 as to open the pipe 18 when the ignition switch 5 is cut off and to control the valve 19 and the solenoid 20 as to close the pipe 18 if the ignition switch 5 is turned on.

When the engine is normally operated, the ignition switch 5 is turned on so that the solenoid valve means 11 closes the pipe 18 by the valve 19. For this reason, the second diaphragm chamber 14 of the diaphragm device 10 is shut off from the atmosphere. The inlet vacuum to be introduced into the first diaphragm chamber 13 of the diaphragm device 10 through the tube 17 tends to absorb the diaphragm 12. However, since the inlet vacuum is smaller than the resiliency of the spring 15, the valve member 7 is not opened. Then, the inlet vacuum introduced into the first diaphragm chamber 13 is introduced from the balance hole 16 of the diaphragm 12 into the second diaphragm chamber 14 so that the pressure difference of both diaphragm chambers gradually reduces to zero. It follows that primary air is not supplied into the inlet passage 3 while the primary air passage 4 is closed by the valve member 7 upon normal operation of the engine excluding deceleration of the engine.

Then, if the engine is declerated, since high inlet vacuum is abruptly introduced through the tube 17 into the diaphragm chamber 13, the diaphragm 12 is absorbed against the resiliency of the spring 15 so as to open the valve member 7. For this reason, a great deal of primary air is supplied into the inlet passage 3 to be mixed with slight mixture from a carburetor 3 and fuel adhered onto the inlet passage 3 so as to dilute the mixture outside of the combustible range. Then, it is introduced into the combustion chamber of the engine and it does not burn within the combustion chamber with the result that it is discharged through the exhaust system into the atmoshere as the original mixture. Accordingly, the generation of the afterburning phenomenon in the exhaust system and the reactor of the engine may be prevented.

Then, if the ignition switch 5 is cut off for stopping the operation of the engine, the solenoid valve means 11 opens the pipe 18. FOr this reason, the pressure within the second diaphragm chamber 14 of the diaphragm device 10 becomes atmospheric pressure. However, the interior of the first diaphragm chamber 13 is subject to the inlet vacuum by the rotary inertia of the engine so that the diaphragm 12 is absorbed against the resiliency of the spring 15 by the difference of the pressure with the atmospheric pressure of the second diaphragm chamber 14 so as to open the valve member 7. Accordingly, slight mixture from the carburetor 2 and fuel adhered onto the inner wall of the inlet passage 3 becomes a dilute mixture outside of the combustible range and is supplied into the combustion chamber of the engine. Whereupon, since the ignition plug is not ignited, the dilute mixture is further introduced into the exhaust system and the high temperature reactor as it is. However, since it is dilute mixture outside of the combustible range, it may not explode to burn to be discharged into the atmosphere. Therefore, the afterburning phenomenon is prevented.

Though the primary air passage 4 communicates with the air cleaner 1 in the aforementioned embodiment, the same object and effect may be obtained by connecting it to an air pump, etc., to supply the air having the pressure larger than the atmospheric pressure.

Preferable embodiments of the present invention have heretofore beeen described, but the other various embodiments may also be considered within the scope of this invention. If the ignition device is so set as to itnite the ignition plug for a while after the ignition switch is cut off and then the primary air supplying means is so set as to supply the proper primary air, and the afterburning phenomenon may be prevented at the same time unburned detrimental components within the exhaust gas may also be removed. Further, if it is constructed so as to supply proper primary air similarly upon deceleration of the engine, the unburned detrimental components within the exhaust gas may further be removed.

What is claimed is:

1. A primary air supply system for an internal combusion engine provided with an inlet passage downstream of a throttle valve, said system comprising:

a primary air passage connecting an air source and the inlet passage, valve means for opening and closing said primary air passage, said valve means comprising a valve member for opening and closing said primary air passage, a spring urging said valve member to close off said primary air passage, a diaphragm device controlling said valve member, a solenoid valve means opening and closing a pipe in response to switching of an engine control switch with the solenoid valve means opening said pipe when the engine switch is cut off, said diaphragm device having a first diaphragm chamber and a second diaphragm chamber divided by a diaphragm, said first diaphragm chamber being connected to the inlet passage, said second diaphragm chamber being connected to said pipe, said pipe being connected to said second diaphragm chamber at one end and connected to the air source at the other end, whereby, when the engine is decelerating, said diaphragm device opens said primary air passage against said spring as result of high inlet vacuum, and when the engine switch is cut off, the solenoid valve means opens said pipe to introduce air into the second diaphragm chamber so that said diaphragm device opens said primary air passage by a difference of pressure between said chambers.

2. The primary air supply system as claimed in claim 1, further comprising: a balance hole within the diaphragm so that pressure differences between both diaphragm chambers gradually balance.

3. A primary air supply system for an internal combustion engine provided with an inlet passage downstream of a throttle valve comprising:
   a. a primary air passage connected between an air source and the inlet passage,
   b. first detecting means for detecting the engine decelerating condition,
   c. second detecting means for detecting the cut-off of an ignition switch,
   d. normally closed valve means disposed on said primary air passage and operatively connected with said first and second detecting means for opening said passage in response to cutting off the ignition switch and deceleration of the engine.

4. A primary air supply system as claimed in claim 3, wherein said first detecting means detects the engine decelerating condition in response to a vacuum signal emanating from the inlet passage.

5. A primary air supply system as claimed in claim 4, wherein said valve means comprises a valve device for opening and closing said primary air passage, and a diaphragm device connected to said valve device for controlling the operation of said valve device and operatively connected to said inlet passage.

6. A primary air supply system as claimed in claim 5, wherein: said diaphragm device has a first diaphragm chamber and a second diaphragm chamber divided by a diaphragm, said first diaphram chamber is connected to the inlet passage, said second diaphragm chamber is operatively connected to the atmosphere through a pipe having a solenoid valve for controlling the connection between said second diaphragm chamber and the atmosphere, said ignition siwtch is connected to said solenoid valve for controlling the operation of said solenoid valve, whereby when the engine is decelerated, said diaphragm device operates said valve device to open said primary air passage owning to the introduction of high inlet vacuum into said first diaphragm chamber, and when said ignition switch is cut off, said solenoid valve operates to open said pipe for introducing air into said second diaphragm chamber so that said diaphragm device operates said valve device to open said primary air passage by a difference of pressure between said first and second diaphragm chambers.

* * * * *

UNITED STATES PATENT OFFICE
CERTIFICATE OF CORRECTION

Patent No. 3,795,230      Dated March 5, 1974

Inventor(s)  Shigetake Yoshimura

It is certified that error appears in the above-identified patent and that said Letters Patent are hereby corrected as shown below:

In the Heading:

The Priority Dates were omitted. Should be:

-- May 27, 1970    Japan ..................... 52476/70 --

-- May 27, 1970    Japan ..................... 52477/70 --

Signed and sealed this 1st day of October 1974.

(SEAL)
Attest:

McCOY M. GIBSON JR.                    C. MARSHALL DANN
Attesting Officer                      Commissioner of Patents